United States Patent
Pettigrew et al.

(10) Patent No.: US 9,489,814 B1
(45) Date of Patent: Nov. 8, 2016

(54) FIRE ALARM SYSTEM

(71) Applicant: Colorado State University Research Foundation, Fort Collins, CO (US)

(72) Inventors: Aaron R. Pettigrew, Fort Collins, CO (US); Brian T. Sedlak, Timnath, CO (US); Scott A. Seeley, Greeley, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 15/050,262

(22) Filed: Feb. 22, 2016

Related U.S. Application Data (60) Provisional application No. 62/216,139, filed on Sep. 9, 2015.

(51) Int. Cl.
| | | |
|---|---|---|
| *G08B 17/12* | (2006.01) | |
| *G08B 17/00* | (2006.01) | |
| *H04L 12/40* | (2006.01) | |
| *H04L 12/66* | (2006.01) | |
| *G08B 25/00* | (2006.01) | |

(52) U.S. Cl.
CPC .............. *G08B 17/00* (2013.01); *G08B 25/004* (2013.01); *H04L 12/40* (2013.01); *H04L 12/66* (2013.01)

(58) Field of Classification Search
CPC ...... G08B 17/00; G08B 25/14; G08B 25/04; G08B 25/00; G08B 25/004; H04L 12/40; H04L 12/66
USPC ........ 340/577, 506, 5.1, 999, 531, 628, 632, 340/573.1, 691.8, 286.05, 514, 286.02, 287, 340/293; 700/79, 80; 73/1.01–1.07
See application file for complete search history.

(56) References Cited

U.S. PATENT DOCUMENTS

| | | | | |
|---|---|---|---|---|
| 8,723,665 | B2 * | 5/2014 | Foisy ................. | G08B 13/1672 340/506 |
| 9,257,032 | B2 * | 2/2016 | Brenner ............... | G08B 25/004 |
| 2003/0234725 | A1 * | 12/2003 | Lemelson .............. | G08B 7/066 340/521 |
| 2005/0231349 | A1 * | 10/2005 | Bhat ........................ | G08B 3/10 340/506 |
| 2014/0145855 | A1 * | 5/2014 | Boisclair ................ | G08B 25/14 340/691.8 |

* cited by examiner

*Primary Examiner* — Anh V La
(74) *Attorney, Agent, or Firm* — Maschoff Brennan (57) ABSTRACT

A fire alarm control and monitoring system is disclosed. In some embodiments, the fire alarm and control system may include a plurality of fire alarm control panels connected together through a communication network. In some embodiments, the fire alarm control panels may communicate using a token passing protocol yet be arranged in a tree network topology.

18 Claims, 8 Drawing Sheets

*FIG. 1*

*(prior art)*

FIRE ALARM SYSTEM

FIELD

This disclosure relates generally to fire alarm control panels.

BACKGROUND

Organizations that own, control, or manage multiple facilities or building such as businesses, property management groups, universities, colleges, or government entities, are often faced with a management and communication problem. For instance, remote and dispersed sites often include one or more continuously and independently operating fire alarm control panels, security systems, building control systems or the like to monitor some or all of the regions of the respective properties. Communication between various fire alarm control panels are commonly organized in a ring topology or bus topology using a token passing protocol. Problems that occur with the various fire alarm control panels or the communication network can be difficult to pinpoint and resolve.

SUMMARY

Some embodiments include a fire alarm system. In some embodiments, the fire alarm system may include a first plurality of sensors disposed throughout a first facility; a first fire alarm control panel communicatively coupled with the first plurality of sensors, the first fire alarm control panel being configured to communicate with other devices via a token passing protocol; a second plurality of sensors disposed throughout a second facility separate and distinct from the first facility; a second fire alarm control panel communicatively coupled with the second plurality of sensors, the second fire alarm control panel being configured to communicate with other devices via the token passing protocol; a first networking switch communicatively coupled with the first fire alarm control panel and the second fire alarm control panel via the token passing protocol; a gateway coupled with the first networking switch; a control center switch communicatively coupled with the gateway; and a control center computer communicatively coupled with the control center switch and configured to communicate with the first plurality of fire alarm control panels and/or the second plurality of fire alarm control panels via a non-token passing protocol such as, for example, an Ethernet protocol. In some embodiments, the gateway may translate non-token passing protocol messages to token passing protocol messages and vice versa.

In some embodiments, the fire alarm control system may include a first plurality of sensors disposed throughout a first facility; a first fire alarm control panel communicatively coupled with the first plurality of sensors; a second plurality of sensors disposed throughout a second facility separate and distinct from the first facility; a second fire alarm control panel communicatively coupled with the second plurality of sensors; a third plurality of sensors disposed throughout a third facility separate and distinct from the first facility and/or the second facility; and a third fire alarm control panel communicatively coupled with the third plurality of sensors. The fire alarm control panel may also include a first networking switch communicatively coupled with the first fire alarm control panel, the second fire alarm control panel, and the third fire alarm control panel; a control center switch communicatively coupled with the first networking switch; and a control center computer communicatively coupled with the control center switch.

In some embodiments, the control center computer may be in communication with the first fire alarm control panel via the control center switch, and the first networking switch; the control center computer may be in communication with the second fire alarm control panel via the control center switch, and the first networking switch; and the control center computer may be in communication with the third fire alarm control panel via the control center switch, and the first networking switch.

In some embodiments, the control center computer may receive data packets from the first fire alarm control panel that do not pass through either or both the second fire alarm control panel and the third fire alarm control panel.

In some embodiments, the fire alarm system may include a gateway communicatively coupled with the first networking switch and the control center switch such that data passed between the first networking switch and the control center switch passes through the gateway.

In some embodiments, the fire alarm system may include a network control module communicatively coupled with the first networking switch and the first fire alarm control panel such that data passed between the first networking switch and the first fire alarm control panel passes through the network control module.

In some embodiments, the fire alarm system may include a network control module communicatively coupled with the second networking switch and/or the second fire alarm control panel such that data passed between the first networking switch and the second fire alarm control panel passes through the network control module.

In some embodiments, the first networking switch may be communicatively coupled with the first fire alarm control panel via a direct connection; the first networking switch may be communicatively coupled with the second fire alarm control panel via a direct connection; and the first networking switch may be communicatively coupled with the third fire alarm control panel via a direct connection.

In some embodiments, the first networking switch may be communicatively coupled with the first fire alarm control panel via a single communication cable; the first networking switch may be communicatively coupled with the second fire alarm control panel via a single communication cable; and the first networking switch may be communicatively coupled with the third fire alarm control panel via a single communication cable.

In some embodiments, the first networking switch may be communicatively coupled with the first fire alarm control panel without passing communication data through another fire alarm device; the first networking switch may be communicatively coupled with the second fire alarm control panel without passing communication data through another fire alarm device; and the first networking switch may be communicatively coupled with the third fire alarm control panel without passing communication data through another fire alarm device.

In some embodiments, the first networking switch may be communicatively coupled with the first fire alarm control panel using a token passing protocol; the first networking switch may be communicatively coupled with the second fire alarm control panel using the token passing protocol; and the first networking switch may be communicatively coupled with the third fire alarm control panel using the token passing protocol.

In some embodiments, the first networking switch may be communicatively coupled with the first fire alarm control panel using an ARCNET-like protocol; the first networking switch may be communicatively coupled with the second fire alarm control panel using the ARCNET-like protocol; and the first networking switch may be communicatively coupled with the third fire alarm control panel using the ARCNET-like protocol.

In some embodiments, the control center computer may transmit data packets to the first fire alarm control panel that do not pass through either or both the second fire alarm control panel and the third fire alarm control panel.

Some embodiments may also include a fire alarm control system that may include a first plurality of sensors disposed throughout a first facility; a first fire alarm control panel communicatively coupled with the first plurality of sensors; a second plurality of sensors disposed throughout a second facility separate and distinct from the first facility; a second fire alarm control panel communicatively coupled with the second plurality of sensors; a first networking switch directly coupled with the first fire alarm control panel using a token passing protocol over a direct connection between the first networking switch and the first fire alarm control panel, and directly coupled with the second fire alarm control panel using a token passing protocol over a direct connection between the first networking switch and the second fire alarm control panel; a control center switch communicatively coupled with the first networking switch; and a control center computer communicatively coupled with the control center switch that is configured to transmit data packets to the first fire alarm control panel that do not pass through the second fire alarm control panel.

In some embodiments, the first networking switch may be communicatively coupled with the first fire alarm control panel without passing communication data through another fire alarm device; the first networking switch may be communicatively coupled with the second fire alarm control panel without passing communication data through another fire alarm device; and the first networking switch may be communicatively coupled with the third fire alarm control panel without passing communication data through another fire alarm device.

In some embodiments, the first networking switch may be communicatively coupled with the first fire alarm control panel using a token passing protocol; the first networking switch may be communicatively coupled with the second fire alarm control panel using the token passing protocol; and the first networking switch may be communicatively coupled with the third fire alarm control panel using the token passing protocol.

In some embodiments, the first networking switch may be communicatively coupled with the first fire alarm control panel using an ARCNET-like protocol; the first networking switch may be communicatively coupled with the second fire alarm control panel using the ARCNET-like protocol; and the first networking switch may be communicatively coupled with the third fire alarm control panel using the ARCNET-like protocol.

In some embodiments, the control center computer may be in communication with the first fire alarm control panel via the control center switch, and the first networking switch. In some embodiments, the control center computer may be in communication with the second fire alarm control panel via the control center switch, and the first networking switch; and the control center computer may be in communication with the third fire alarm control panel via the control center switch, and the first networking switch.

In some embodiments, the control center computer may receive data packets from the first fire alarm control panel that do not pass through either or both the second fire alarm control panel and the third fire alarm control panel.

In some embodiments, a gateway may be communicatively coupled with the first networking switch and the control center switch such that data passed between the first networking switch and the control center switch passes through the gateway.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Fire alarm control systems are disclosed according to various embodiments. The fire alarm control systems disclosed may be arranged in a tree network topology or a mesh hybrid topology yet communicate with a token passing protocol. In some embodiments, a fire alarm control system may include a plurality of fire alarm control panels spread among a plurality of locations, buildings, facilities, and/or portions of a building. The fire alarm control system may include a plurality of switches that direct communication between a control workstation and the plurality of workstations. In some embodiments, a portion of the communication between the workstation and the plurality of fire alarm control panels may include a communication (e.g., a direct communication) between a switch and a fire alarm control panel without passing the communication through another fire alarm control panel. In some embodiments, a portion of the communication between the workstation and the plurality of fire alarm control panels may include communication via devices on an Ethernet network and devices on a token-passing network. In some embodiments, a gateway or a network communication module may translate messages between devices on the Ethernet network and devices on the token-passing network.

Figure 1:
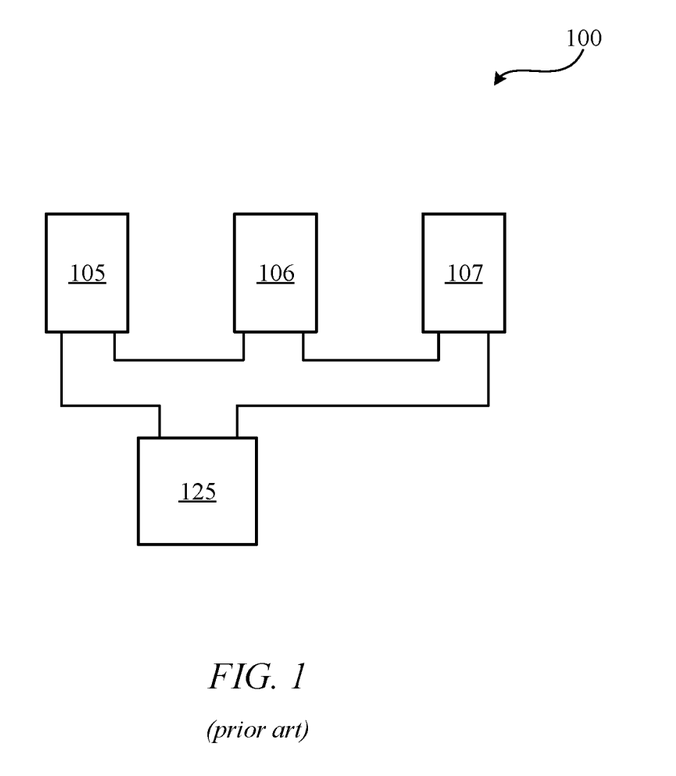
FIG. 1 is a block diagram of a fire alarm control network according to prior art systems.

FIG. 1 is a block diagram of a fire alarm control network 100 according to prior art systems. Fire alarm control network 100 is configured with a ring network topology as shown in the figure. In this topology, messages are passed from one device to another device in the network until the message reaches its destination. As shown, a fire alarm control panel 105, a fire alarm control panel 106, a fire alarm control panel 107, and a workstation 125 are communicatively coupled in the ring network. In this network, in order for the workstation to communicate with the fire alarm control panel 106, a message must be passed through either fire alarm control panel 105 or fire alarm control panel 107, and vice versa. Thus, there is no direct communication between the fire alarm control panel 106 and a server, a switch, or a work station. In this configuration any device can only be directly coupled with two devices.

This network topology can be problematic for many reasons. For instance, in a ring topology it can be difficult to ascertain the source of network failures. Because the fire alarm control panels are linked together in a ring, a failure at one fire alarm control panel may cause communication problems to one or more of the other fire alarm control panels in the network. Similar problems may occur in fire alarm control systems having a ring network topology.

Figure 2:
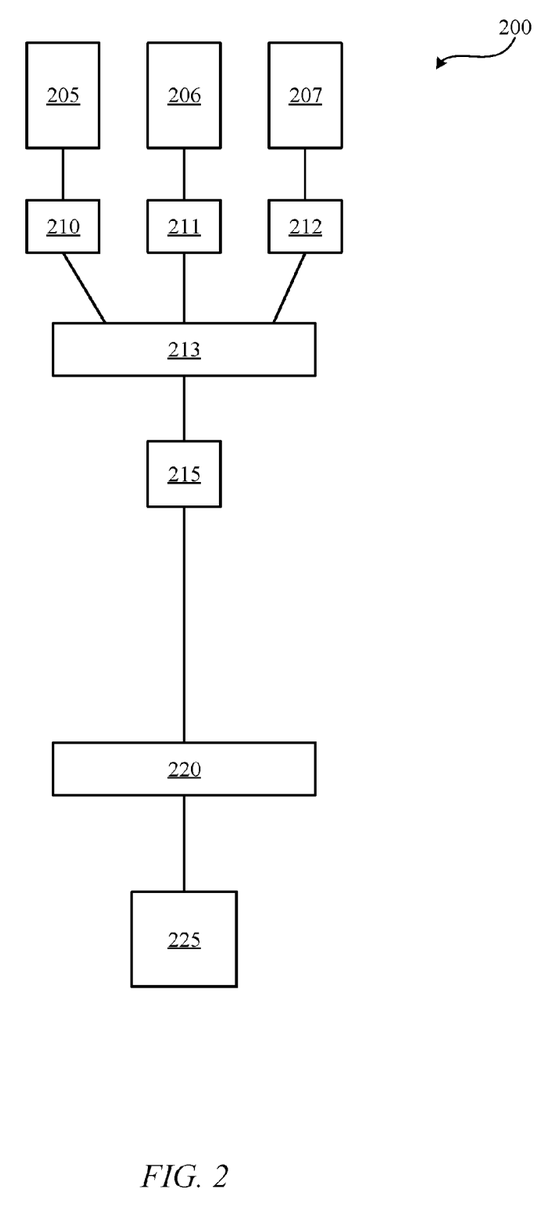
FIG. 2 is a block diagram of a fire alarm control system according to some embodiments.

FIG. 2 is a block diagram of a fire alarm control system 200 according to some embodiments. In this embodiment, the system is arranged in a tree network topology. The fire alarm control system 200 may include a group of fire alarm control panels 205, 206, and 207 communicatively coupled with a first switch 213 via network communication modules 210, 211, and 212 respectively. While three fire alarm control panels are shown coupled to the first switch 213 any number of fire alarm panels may be communicatively coupled with the first switch 213. The first switch 213 may be communicatively coupled with a first gateway 215 that may be coupled with a communication switch 220. The communication switch 220 (or control center switch) may be communicatively coupled with a control center computer 225.

Each of the group of fire alarm control panels 205, 206, and 207 may be communicatively coupled with one or more sensors. These sensors may include one or more heat sensors, smoke detectors, flame detectors, pull station monitors, notification appliances, displays, speakers, strobes, lights, sounders, aspiration sensors, detectors, beam detectors, duct detectors, flow switches, tamper valves, security alarms, etc. In some embodiments, the sensors may include any type of device that may communicate with a fire alarm control panel. A fire alarm control panel may communicate with a sensor using any type of communication protocol such as, for example, Flashscan, clip, SD, fast, light speed, etc. The sensors may be distributed around a building, a portion of a building, or multiple buildings. In some embodiments, each of these sensors may be uniquely addressable. For example, each sensor may have a unique address identifier that uniquely identifies the sensor when communicating with the fire alarm control panel. In some embodiments, more than one hundred sensors may be coupled with one of the fire alarm control panels 205, 206, and 207.

In some embodiments, each of the group of fire alarm control panels 205, 206, and 207 may be installed, placed, operated, and/or disposed within separate buildings (or facilities) or separate portions of the same building (or facility).

In some embodiments, each of the group of fire alarm control panels 205, 206, and 207 may gather data from one or more of the plurality of sensors communicatively coupled with a respective fire alarm control panel. Each of the fire alarm control panels 205, 206, and 207 may be communicatively coupled with a respective one of a network communication module 210, 211, and/or 212 with a communication cable such as, for example, a Nup-Port cable, Serial ATA Cable, coaxial cable, Fiber Optic (Multi Mode or Single Mode) cable, a twisted pair cable, an Ethernet cable, a proprietary communication cable, etc. Any other type of communication cable may also be used.

One or more of the network communication modules 210, 211, and/or 212 may include a different type of network communication module than one or more of the other network communication modules. In some embodiments, a network communication module (e.g., network communication module 210, 211, or 212) may provide a network interface between a fire alarm control panel and a switch (e.g., the first switch 213). In some embodiments, one or more of the network communication modules 210, 211, and/or 212 may include any type of network communication device such as, for example, a network gateway, a switch, a server, a bridge, a computer, etc.

In some embodiments, one of the network communication modules 210, 211, and/or 212 may be coupled with a respective one of the fire alarm control panels 205, 206, and/or 207 with a communication cable such as, for example, a Nup-Port cable, Serial ATA Cable, coaxial cable, Fiber Optic (Multi Mode or Single Mode) cable, a twisted pair cable, an Ethernet cable, a proprietary communication cable, etc. Any other type of communication cable may also be used.

In some embodiments, a network communication module (e.g., network communication module 210, 211, or 212) may translate data from a first communication protocol to a second protocol and vice versa. For example, a fire alarm control panel may send a message (or packet) according to a first communication protocol (e.g., a token passing protocol) to a network communication module. The network communication module may translate the message into a message according to a second communication protocol (e.g., a non-token passing protocol, an Ethernet protocol, and/or a TCP/IP protocol) and send the message to a switch (e.g., the first switch 213). As another example, the switch may receive a message from a central computer (or another device) according to the second communication protocol. The switch may communicate the message to the network communication module whereupon the network communication module may translate the message into a message according to the first communication protocol and send the message to a fire alarm control panel.

In some embodiments, each of the network communication modules 210, 211, and/or 212 may be coupled with the first switch 213 with a communication cable such as, for example, a Nup-Port cable, Serial ATA Cable, coaxial cable, Fiber Optic (Multi Mode or Single Mode) cable, a twisted pair cable, an Ethernet cable, a proprietary communication cable, etc. Any other type of communication cable may also be used.

In some embodiments, the network communication modules 210, 211, and/or 212 may not be used. For example, the fire alarm control panels 205, 206, and 207 may be communicatively coupled with the first switch 213 with a communication cable such as, for example, a Nup-Port cable, Serial ATA Cable, coaxial cable, Fiber Optic (Multi Mode or Single Mode) cable, a twisted pair cable, an Ethernet cable, a proprietary communication cable, etc. Any other type of communication cable may also be used.

In some embodiments, the first switch 213 may include any type of networking switch. In some embodiments, the first switch 213 may forward data to and from the fire alarm control panels 205, 206, and 207 to the first gateway 215. In some embodiments, the first switch 213 may be a managed or unmanaged switch (e.g., an unmanaged Ethernet a switch). In some embodiments, the first switch 213 may forward data to and from the fire alarm control panels and/or the first gateway 215 based on addresses in the data.

In some embodiments, the first gateway 215 may translate data from a first communication protocol to a second protocol and vice versa. For example, the first switch 213 may send a message (or packet) according to a first communication protocol (e.g., a token passing protocol) to the first gateway 215. The first gateway 215 may translate the message into a message according to a second communication protocol (e.g., a non-token passing protocol, an Ethernet protocol, and/or a TCP/IP protocol) and send the message to the communication switch 220. As another example, the communication switch 220 may receive a message from a central computer (or another device) according to the second communication protocol, whereupon the first gateway 215 may translate the message into a message according to the first communication protocol and send the message to the first switch 213 and ultimately to a fire alarm control panel.

In some embodiments, the first gateway 215 may provide a network interface between two networks communicating with two different protocols such as, for example, between a token passing protocol, an Ethernet protocol, and/or a TCP/IP protocol; or between a token passing protocol and a non-token passing protocol. In some embodiments, the first gateway 215 may include a protocol translator, an impedance matching device, a rate converter, a fault isolator, and/or a signal translator, etc. In some embodiments, the first gateway 215 may be a protocol translation/mapping gateway that interconnects networks with different network protocol technologies by performing the required protocol conversions. In some embodiments, the first gateway 215 may be coupled with a network communication module.

In some embodiments, the first gateway 215 and the first switch 213 may be a single component. In some embodiments, the first gateway 215 and the communication switch 220 may be a single component.

In some embodiments, the first gateway 215 may include any type of network communication device such as, for example, a network gateway, a switch, a server, a bridge, a computer, a network communication device, etc.

In some embodiments, the first switch 213 may be included into one of the fire alarm control panels 205, 206, or 207. In some embodiments, a network communication module (e.g., network communication module 210) may be included within one or more of the fire alarm control panels. In some embodiments, the first switch 213 may be built into the first gateway 215. In some embodiments, a network communication module may be included within a fire alarm control panel.

In some embodiments, the first switch 213 may communicate with the fire alarm control panel (any of fire alarm control panels 205, 206, or 207) using a token passing protocol such as, for example, ARCNET, token ring, or NOTI-FIRE-NET protocols. While the first switch 213 and the fire alarm control panels may use a token passing protocol, the first switch 213 and the fire alarm control panels are not arranged in a ring configuration. Instead, for example, the first switch 213 and each of the fire alarm control panels 205, 206, 207 are coupled directly together. For example, a single network cable may be connected between a fire alarm control panel and the first switch 213. As another example, the first switch 213 may communicate with the fire alarm control panel 205 without passing data to or through fire alarm control panel 206 or fire alarm control panel 207.

The first gateway 215 may be coupled with the first switch 213. The first gateway 215, for example, may include a UL Listed 864 Networking Switch.

The communication switch 220 may be a switch similar to the first switch 213 and/to the first gateway 215. The communication switch 220 and the first gateway 215 may be communicatively coupled with a communication cable such as, for example, a Nup-Port cable, Serial ATA Cable, Fiber Optic (Multi Mode or Single Mode) cable, a twisted pair cable, an Ethernet cable, a proprietary communication cable, etc. Any other type of communication cable may also be used.

In some embodiments, the communication switch 220 may be a managed or unmanaged switch (e.g., an unmanaged Ethernet switch). In some embodiments, the communication switch 220 may forward data to and from the first gateway 215 and/or the control center computer 225. In some embodiments, the communication switch 220 and the control center computer 225 may be communicatively coupled with a communication cable such as, for example, a Nup-Port cable, Serial ATA Cable, Fiber Optic (Multi Mode or Single Mode) cable, a twisted pair cable, an Ethernet cable, a proprietary communication cable, etc. Any other type of communication cable may also be used.

In some embodiments, the communication switch 220 may be coupled with the Internet via a firewall and/or a network server. In some embodiments, the fire alarm control system 200 may comprise a dedicated network.

The control center computer 225 may be any type of network enabled computer system. In some embodiments, more than one control center computer may be used. In some embodiments, the control center computer 225 may be located in a dispatch center, a maintenance center, a fire command center, etc. In some embodiments, the control center computer 225 may be configured to relay the messages to and from the fire alarm control panels 205, 206, and 207.

In some embodiments, the fire alarm control panels 205, 206, and 207 can communicate with the first switch 213 using a token passing protocol despite not being in a ring network topology. For example, the token passing protocol may include the ARCNET protocol, a protocol like the ARCNET protocol, or the NOTI•FIRE•NET protocol. In a token passing protocol, for example, a token message may be passed between a fire alarm control panel and the first switch 213. The device with the token at any given time may have access to communicate on the channel provided by the wire between the two devices.

In some embodiments, the control center computer 225 may communicate with each of the fire alarm control panels 205, 206, and/or 207 through the fire alarm control system 200 using a token passing communication protocol. For example, the control center computer 225 may send a request to the fire alarm control panel 205 for a status update. The request (or request message) may include a unique address identifying the fire alarm control panel 205 and may be transmitted through the communication switch 220, the first gateway 215, and the first switch 213. Based on the unique address of the request, the communication switch 220, the first gateway 215, and the first switch 213 may route the request to the fire alarm control panel 205 such that the request does not pass through the fire alarm control panel 206 or the fire alarm control panel 207. The first switch 213 may pass the request directly to the fire alarm control panel 205 based on the unique address when the first switch 213 has the token (or permission) to communicate on the channel (or communication cable) between the first switch 213 and the fire alarm control panel 205.

In response, for example, the fire alarm control panel 205 may send a message back to the workstation through the fire alarm control system 200. The response may be sent directly from the fire alarm control panel 205 (or the network communication module 210) to the first switch 213 when the fire alarm control panel 205 has the token (or permission) to communicate on the channel (or communication cable) between the first switch 213 and the fire alarm control panel 205 (or the network communication module 210). The response may not be transmitted to or through the fire alarm control panel 206 or the fire alarm control panel 207. The response may then be passed through the fire alarm control system 200 to the workstation. In some embodiments, a network control module (e.g., network communication module 210) may be used between any devices in the fire alarm control system 200 to translate data from one communication protocol to another.

Other messages may be sent to or from the fire alarm control panel 205 (or any other fire alarm control panel) to the control center computer 225. For example, the fire alarm control panel 205 may send periodic status updates to the workstation. As another example, the fire alarm control panel 205 may send alarm messages to the control center computer 225 based on signals from the sensors coupled with the fire alarm control panel 205. As another example, the fire alarm control panel 205 may send sensor data to the control center computer 225 in response to a request or periodically. Various other messages may be passed between the fire alarm control panel 205 and the control center computer 225 through the fire alarm control system 200.

Figure 3:
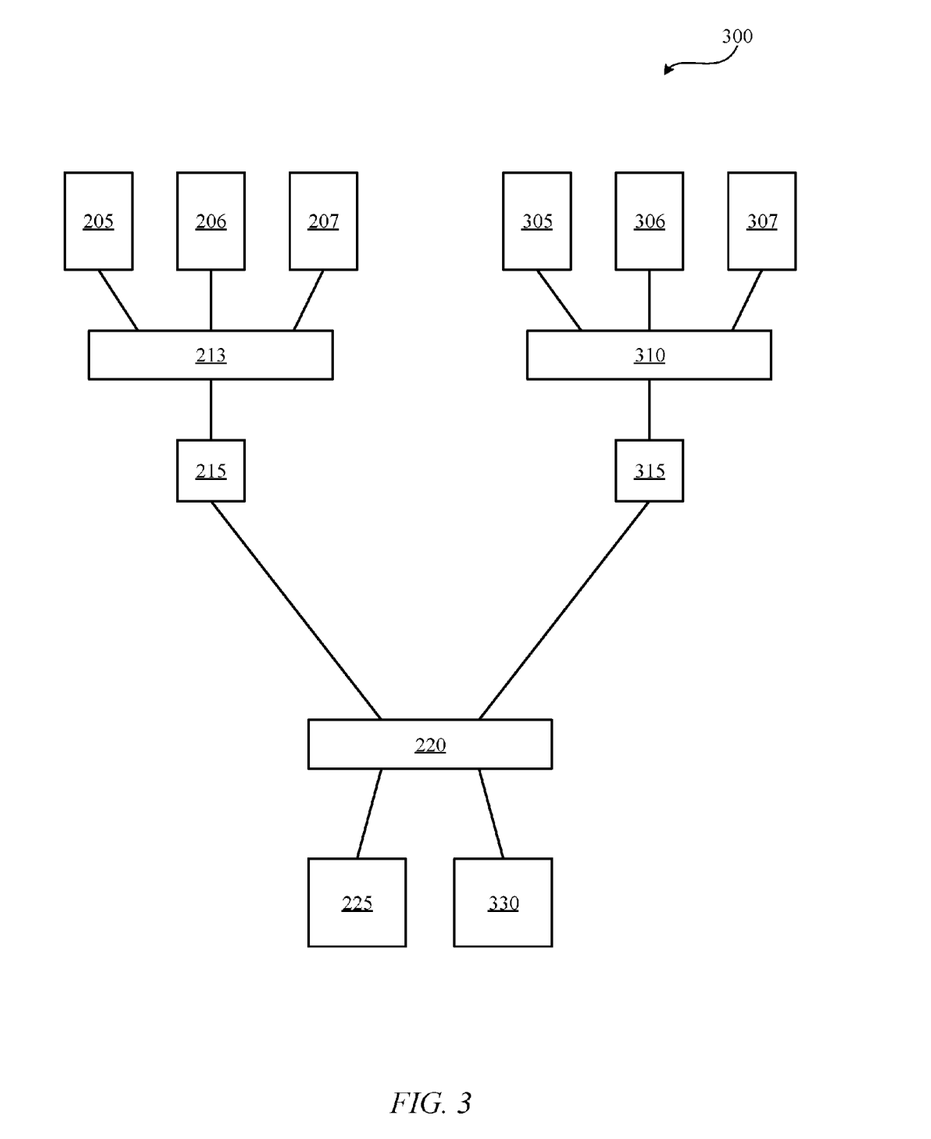
FIG. 3 is a block diagram of a fire alarm control system according to some embodiments.

FIG. 3 is a block diagram of a fire alarm control system 300 according to some embodiments. In this embodiment, the system is arranged in a tree network topology. The fire alarm control system 300 may include a first group of fire alarm control panels 205, 206, and 207 communicatively coupled with a first switch 213; and a second group of fire alarm control panels 305, 306, and 307 communicatively coupled with a third switch 310. While three fire alarm control panels are shown coupled to the first switch 213 and three fire alarm control panels are shown coupled with the third switch 310 any number of fire alarm panels may be communicatively coupled with either or both the first switch 213 or the third switch 310. The first switch 213 may be communicatively coupled with a first gateway 215. The third switch 310 may also be communicatively coupled with the second gateway 315. The first gateway 215 may be coupled with a communication switch 220. The communication switch 220 (or control center switch) may be communicatively coupled with a control center computer 225.

Each of the group of fire alarm control panels 205, 206, 207, 305, 306, and/or 307 may be communicatively coupled with one or more sensors. These sensors may include one or more heat sensors, smoke detectors, flame detectors, pull station monitors, notification appliances, speakers, strobes, lights, sounders, aspiration sensors, detectors, beam detectors, duct detectors, flow switches, tamper valves, security alarms, etc. The sensors may be distributed around a building, a portion of a building, or multiple buildings. In some embodiments, each of these sensors may be uniquely addressable. For example, each sensor may have a unique address identifier that uniquely identifies the sensor when communicating with the fire alarm control panel. In some embodiments, more than one hundred sensors may be coupled with one of the fire alarm control panels 205, 206, 207, 305, 306, and/or 307.

In some embodiments, each of the group of fire alarm control panels 205, 206, 207, 305, 306, and/or 307 may be installed, placed, operated, and/or disposed within separate buildings (or facilities) or separate portions of a building (or facility).

In some embodiments, each of the group of fire alarm control panels 205, 206, 207, 305, 306, and/or 307 may gather data from one or more of the plurality of sensors communicatively coupled with a respective fire alarm control panel. Each of the fire alarm control panels 205, 206, and 207 may be communicatively coupled with the first switch 213 with a communication cable such as, for example, a Nup-Port cable, Serial ATA Cable, coaxial cable, Fiber Optic (Multi Mode or Single Mode) cable, a twisted pair cable, an Ethernet cable, a proprietary communication cable, etc. Any other type of communication cable may also be used. Each of the fire alarm control panels 305, 306, and 307 may be communicatively coupled with the third switch 310 with a communication cable such as, for example, a Nup-Port cable, Serial ATA Cable, coaxial cable, Fiber Optic (Multi Mode or Single Mode) cable, a twisted pair cable, an Ethernet cable, a proprietary communication cable, etc. Any other type of communication cable may also be used.

The first switch 213 may include any type of networking switch. In some embodiments, the first switch 213 may forward data to and from the fire alarm control panels 205, 206, and 207 to the first gateway 215. In some embodiments, the first switch 213 may be a managed or unmanaged switch (e.g., an unmanaged Ethernet switch). In some embodiments, the first switch 213 may forward data to and from the fire alarm control panels 205, 206, 207 and/or the first gateway 215 based on addresses in the data.

The third switch 310 may include any type of networking switch. In some embodiments, the third switch 310 may forward data to and from the fire alarm control panels 305, 306, and 307 to the second gateway 315. In some embodiments, the third switch 310 may be a managed or unmanaged switch (e.g., an unmanaged Ethernet switch). In some embodiments, the third switch 310 may forward data to and from the fire alarm control panels 305, 306, 307 and/or the second gateway 315 based on addresses in the data. The second gateway 315 may be coupled with a communication switch 220.

In some embodiments, the first switch 213 may be built into one of the fire alarm control panels 205, 206, or 207. In some embodiments, the first switch 213 may be built into the first gateway 215. In some embodiments, the third switch 310 may be built into one of the fire alarm control panels 305, 306, or 307. In some embodiments, the third switch 310 may be built into the second gateway 315.

In some embodiments, the first switch 213 may communicate with the fire alarm control panels 205, 206, 207 using a token passing protocol such as, for example, ARCNET, token ring, or NOTI-FIRE-NET protocol. While the first switch 213 and the fire alarm control panels 205, 206, 207 may use a token passing protocol, the first switch 213 and the fire alarm control panels are not arranged in a ring configuration. Instead, for example, the first switch 213 and each of the fire alarm control panels 205, 206, 207 are directly coupled together. For example, a single network cable may be connected between one of the fire alarm control panels 205, 206, 207 and the first switch 213. As another example, the first switch 213 may communicate with the fire alarm control panel 205 without passing data to or through fire alarm control panel 206 or fire alarm control panel 207.

The third switch 310 may communicate with the fire alarm control panels 305, 306, 307 using a token passing protocol such as, for example, ARCNET, token ring, or NOTI-FIRE-NET protocols. While the third switch 310 and the fire alarm control panels 305, 306, 307 may use a token passing protocol, the third switch 310 and the fire alarm control panels are not arranged in a ring configuration. Instead, for example, the third switch 310 and each of the fire alarm control panels 305, 306, 307 are directly coupled together. For example, a single network cable may be connected between one of the fire alarm control panels 305, 306, 307 and the third switch 310. As another example, the third switch 310 may communicate with the fire alarm control panels 305 without passing data to or through fire alarm control panel 306 or fire alarm control panel 307.

The first gateway 215 may be coupled with the first switch 213. The second gateway 315 may be coupled with the third switch 310. The first switch 213, the first gateway 215, the third switch 310, and/or the second gateway 315 for example, may include a UL Listed 864 Networking Switch.

In some embodiments, the second gateway 315 may translate data from a first communication protocol to a second protocol and vice versa. For example, the third switch 310 may send a message (or packet) according to a first communication protocol (e.g., a token passing protocol) to the second gateway 315. The second gateway 315 may translate the message into a message according to a second communication protocol (e.g., a non-token passing protocol, Ethernet protocol, and/or a TCP/IP protocol) and send the message to the communication switch 220. As another example, the communication switch 220 may receive a message from a central computer (or another device) according to the second communication protocol, whereupon the second gateway 315 may translate the message into a message according to the first communication protocol and send the message to the third switch 310 and ultimately to one of the fire alarm control panels 305, 306, or 307.

In some embodiments, the second gateway 315 may provide a network interface between two networks communicating with two different protocols such as, for example, between a token passing protocol, Ethernet protocol, and/or a TCP/IP protocol; or between a token passing protocol and a non-token passing protocol. In some embodiments, the second gateway 315 may include a protocol translator, an impedance matching device, a rate converter, a fault isolator, and/or a signal translator, etc. In some embodiments, the second gateway 315 may be a protocol translation/mapping gateway that interconnects networks with different network protocol technologies by performing the required protocol conversions.

The communication switch 220 may be a switch similar to the first switch 213, the first gateway 215, the third switch 310, and/or the second gateway 315. The communication switch 220 and the first gateway 215 may be communicatively coupled with a communication cable such as, for example, a Nup-Port cable, Serial ATA Cable, Fiber Optic (Multi Mode or Single Mode) cable, a twisted pair cable, an Ethernet cable, a proprietary communication cable, etc. Any other type of communication cable may also be used. The communication switch 220 and the second gateway 315 may be communicatively coupled with a communication cable such as, for example, a Nup-Port cable, Serial ATA Cable, Fiber Optic (Multi Mode or Single Mode) cable, a twisted pair cable, an Ethernet cable, a proprietary communication cable, etc. Any other type of communication cable may also be used.

In some embodiments, the communication switch 220 may be a managed or unmanaged switch (e.g., an unmanaged Ethernet switch). In some embodiments, the communication switch 220 may forward data to and from the first gateway 215 and/or the control center computer 225 and/or workstation 330. In some embodiments, the communication switch 220 and the control center computer 225 and/or workstation 330 may be communicatively coupled with a communication cable such as, for example, a Nup-Port cable, Serial ATA Cable, Fiber Optic (Multi Mode or Single Mode) cable, a twisted pair cable, an Ethernet cable, a proprietary communication cable, etc. Any other type of communication cable may also be used.

The control center computer 225 and/or workstation 330 may be any type of network enabled computer system. In some embodiments, more than one control center computer may be used. In some embodiments, the control center computer 225 and/or workstation 330 may be located in a dispatch center, a maintenance center, a fire command center, etc. In some embodiments, the control center computer 225 and/or workstation 330 may be configured to relay the messages to and from the fire alarm control panels 205, 206, 207, 305, 306, and/or 307.

In some embodiments, the fire alarm control panels 205, 206, and 207 can communicate with first switch 213 using a token passing protocol despite not being in a ring network topology. For example, the token passing protocol may include the ARCNET protocol, a protocol like the ARCNET protocol, or the NOTI•FIRE•NET protocol. In a token passing protocol, for example, a token message may be passed between a fire alarm control panel and the first switch. The device with the token at any given time may have access to communicate on the channel provided by the wire between the two devices.

In some embodiments, the fire alarm control panels 305, 306, and 307 can communicate with the third switch 310 using a token passing protocol despite not being in a ring network topology. For example, the token passing protocol may include the ARCNET protocol, a protocol like the ARCNET protocol, or the NOTI•FIRE•NET protocol. In a token passing protocol, for example, a token message may be passed between a fire alarm control panel and the first switch. The device with the token at any given time may have access to communicate on the channel provided by the wire between the two devices.

In some embodiments, the fire alarm control panels 305, 306, and 307 may include a network communication module. In some embodiments, a network communication module may be disposed between the third switch 310 and/or one of the fire alarm control panels 305, 306, and/or 307.

In some embodiments, the fire alarm control system 300 may comprise a dedicated network.

Figure 4:
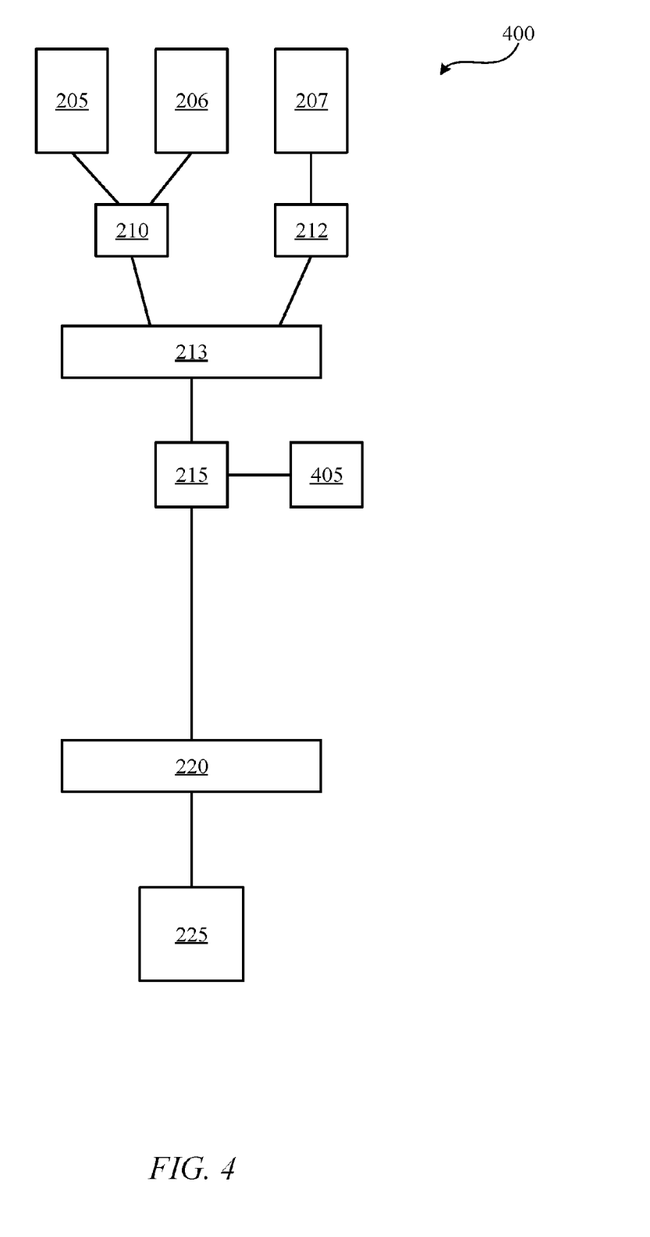
FIG. 4 is a block diagram of a fire alarm control system according to some embodiments.

FIG. 4 is a block diagram of a fire alarm control system 350 according to some embodiments. The fire alarm control system 350 includes a topology somewhat similar to the topology shown in FIG. 2 with a couple examples of changes in the topology. In this example, the fire alarm control panels 205 and 206 communicate with the first switch 213 via the same network communication module 210. In some embodiments, more than two fire alarm control panels may be communicate with the first switch 213 via the same network communication module. The fire alarm control panel 207 communicates with the first switch 213 via the network communication module 212.

Alternatively or additionally, the first gateway 215 may include a network communication module 405 that may be used to communicate with either or both the first switch 213 and the communication switch 220.

Figure 5:
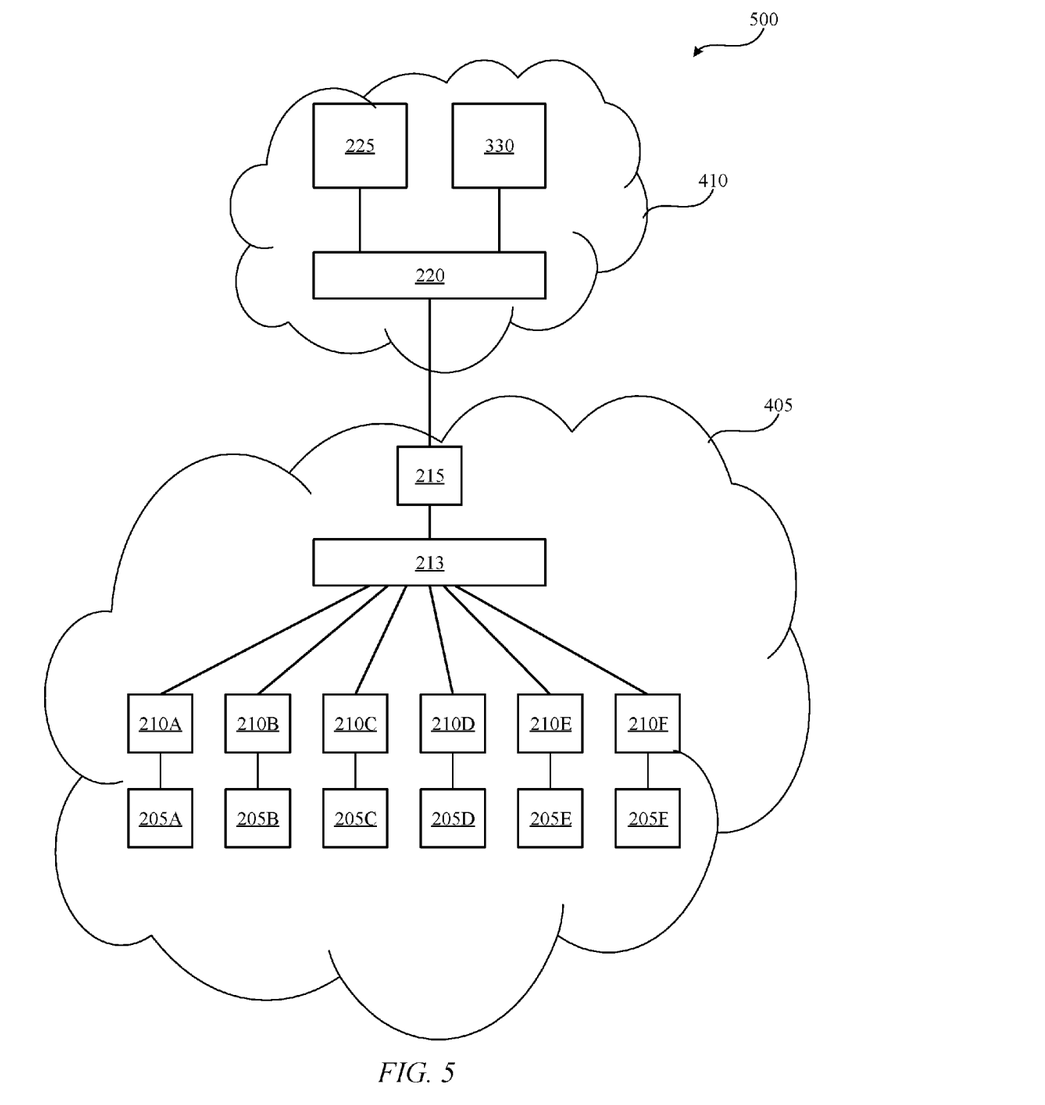
FIG. 5 is a block diagram of a fire alarm control system according to some embodiments.

FIG. 5 is a block diagram of a fire alarm control system 400 according to some embodiments. FIG. 5 illustrates a topology similar to the topology shown in FIG. 2. In this example, six fire alarm control panels 205A, 205B, 205C, 205D, 205E, and 205F (e.g., individually or collectively fire alarm control panel 205). Each fire alarm control panel 205 may be communicatively coupled with a network communication module 210A, 210B, 210C, 210D, 210E, and 210F (e.g., individually or collectively network communication module 210). For example, the fire alarm control panel 205 is communicatively coupled with the network communication module 210. The network communication module 210 may provide network access for the fire alarm control panel 205. The network communication module 210, for example, may provide access to the channel (or wire) using a token passing protocol. The network communication module 210 may be communicatively coupled with a first switch 213 and a first gateway 215.

In some embodiments, a first network 405 may include the fire alarm control panel 205, the network communication module 210, the first switch 213, and the first gateway 215. In some embodiments, the devices on the first network 405 may communicate using a first network protocol such as, for example, a token passing protocol. In some embodiments, the devices on the first network 405 may comprise a token passing network or a token ring network.

In some embodiments, a second network 410 may include a communication switch 220, a control center computer 225, and/or workstation 330 that communicates with a second communication protocol such as, for example, a non-token passing protocol, an Ethernet protocol, and/or a TCP/IP protocol. In some embodiments, the first gateway 215 may translate messages sent according to the first communication protocol to messages according to the second communication protocol or vice versa.

In some embodiments, the first network 405 and/or the second network 410 may comprise a dedicated network.

Figure 6:
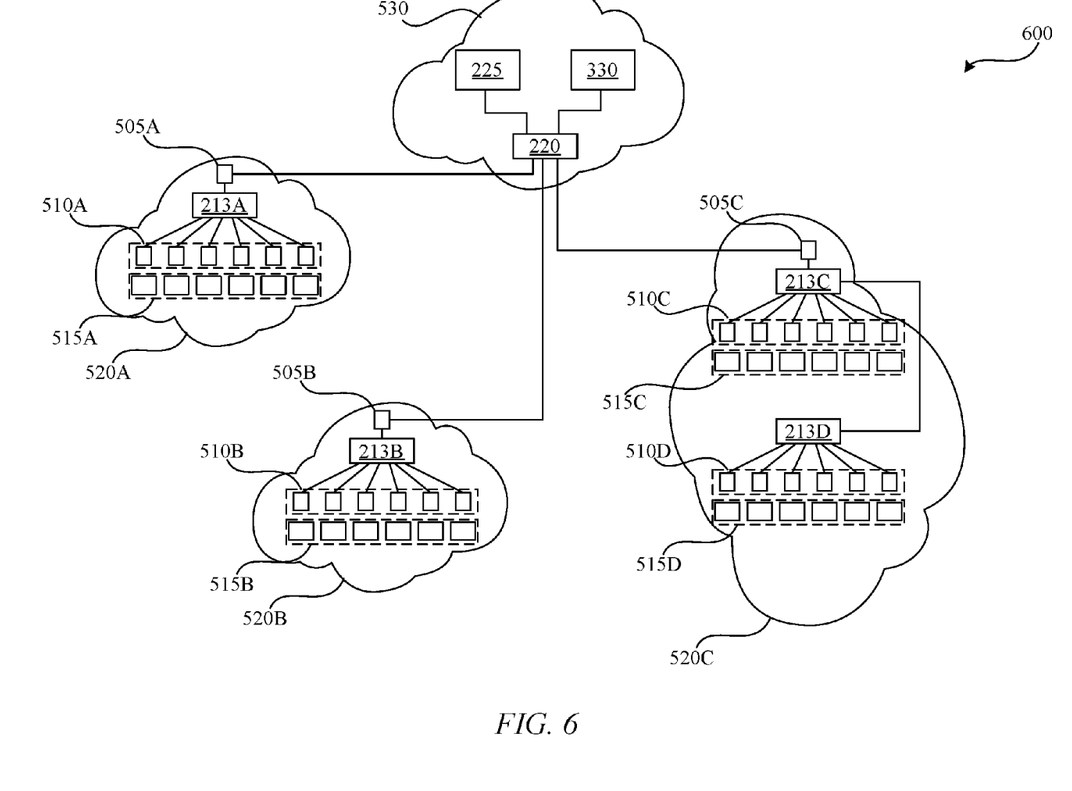
FIG. 6 is a block diagram of a fire alarm control system according to some embodiments.

FIG. 6 is a block diagram of a fire alarm control system 500 according to some embodiments. The fire alarm control system 500 may include a plurality of networks. In this example, a first network 520A, a second network 520B, a third network 520C, and fourth network 530 are included. In some embodiments, the devices within the first network 520A, the second network 520B, and/or the third network 520C may communicate using a token passing protocol. In some embodiments, the devices within the fourth network 530 may communicate with a non-token passing protocol.

The first network 520A, the second network 520B, and the third network 520C may each include one or more plurality of fire alarm control panels 515A, 515B, or 515C and/or one or more plurality of network communication modules 510A, 510B, or 510C communicatively coupled with a first switch 213A, a second switch 213B, and/or a third switch 213C and a first gateway 505A, 505B, or 505C. The third network 520C also includes a second plurality of fire alarm control panels 515D and/or a second plurality of network communication modules 510D communicatively coupled with a fourth switch 213D. The fourth switch 213D may be communicatively coupled with the third gateway 505C and/or the third switch 213C. Various other devices may be included in the first network 520A, the second network 520B, and/or the third network 520C.

In some embodiments, the devices on the first network 520A, the second network 520B, and/or the third network 520C may communicate with a first communication protocol such as, for example, with a token passing protocol.

In some embodiments, the fourth network 530 may include a communication switch 220, and control center computer 225 and/or workstation 330. In some embodiments, the devices on the fourth network 530 may communicate with a second communication protocol such as, for example, with a non-token passing protocol (e.g., an Ethernet protocol, and/or a TCP/IP protocol).

In some embodiments, the first gateway 505A, the second gateway 505B, and/or the third gateway 505C may translate data from a first communication protocol to a second protocol and vice versa. In some embodiments, the first gateway 505A, the second gateway 505B, and/or the third gateway 315C may be similar to the first gateway 215 and/or provide the functions described in regard to the first gateway 215.

In some embodiments, the first gateway 505A, the second gateway 505B, and/or the third gateway 315C may be communicatively coupled with the communication switch 220 in the fourth network 520D.

Figure 7:
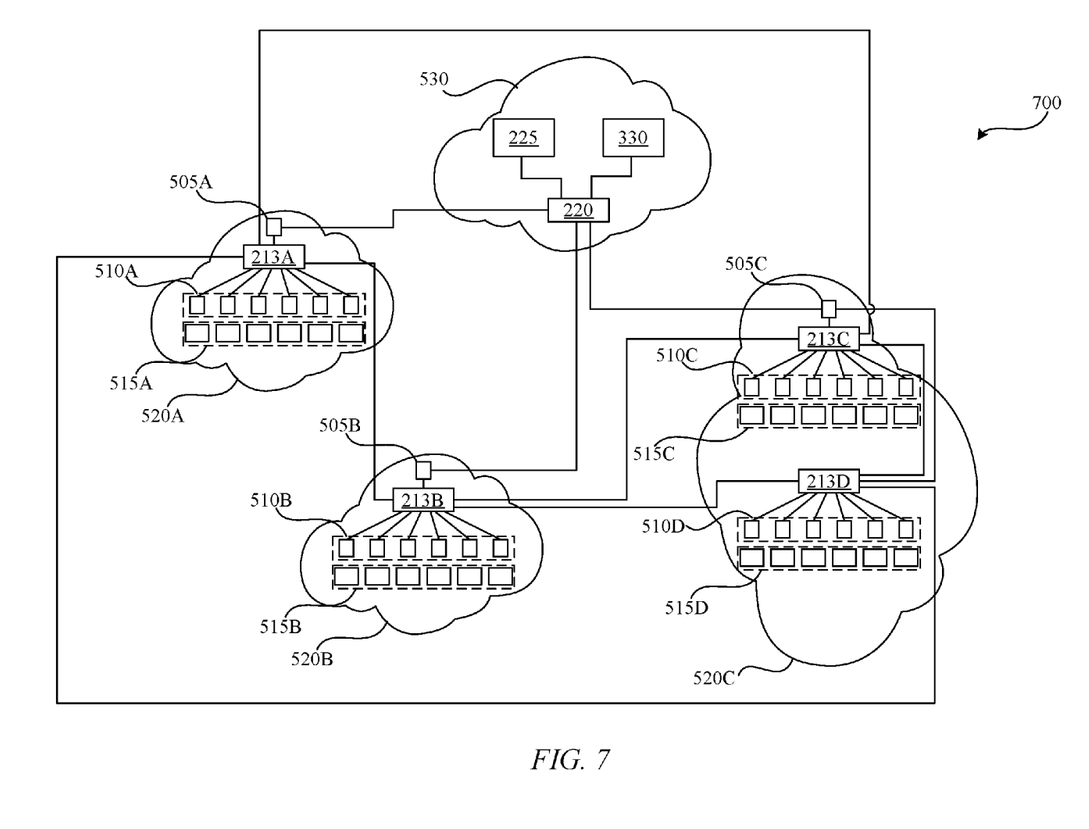
FIG. 7 is a block diagram of a fire alarm control system according to some embodiments.

As shown in FIG. 7, in some embodiments, the first switch 213A may be communicatively coupled with either or both the second switch 213B, the third switch 213C, and/or the fourth switch 213D. In some embodiments, the second switch 213B may be communicatively coupled with either or both the first switch 213A, switch the 213C, and/or the fourth switch 213D. In some embodiments, the third switch 213C may be communicatively coupled with either or both the second switch 213B and the first switch 213A in addition to fourth switch 213D. In some embodiments, the fourth switch 213D may be communicatively coupled with either or both the second switch 213B and the first switch 213A in addition to third switch 213C. In FIG. 7, the network forms a hybrid mesh topology.

In some embodiments, the first network 520A, the second network 520B, the third network 520C, and/or the fourth network 530 may comprise a dedicated network.

Alternatively or additionally, redundancy may occur by coupling multiple switches to multiple gateways. For example, the first switch 213A may be communicatively coupled with either or both the first gateway 505B and the second gateway 315 in addition to the first gateway 505A. In some embodiments, the second switch 213B may be communicatively coupled with either or both the first gateway 505A and the second gateway 315 in addition to the first gateway 505B. In some embodiments, the third switch 213C may be communicatively coupled with either or both the first gateway 505B and the first gateway 505A in addition to the second gateway 315. In some embodiments, the fourth switch 213D may be communicatively coupled with either or both the first gateway 505B and the first gateway 505A in addition to the second gateway 315.

Various other redundancies may be included. For example, a fifth network may be included that includes a communication switch, a control center computer and/or a workstation. The fifth network may include components similar to or somewhat similar to components in the fourth network 530. In some embodiments, the devices on the fifth network may communicate with a second communication protocol such as, for example, with a non-token passing protocol (e.g., an Ethernet protocol, and/or a TCP/IP protocol). The communication switch in the fifth network may be communicatively coupled with the communication switch 220 in the fourth network 530. Alternatively or additionally, the first gateway 505A, the second gateway 505B, and/or the third gateway 505C may also be communicatively coupled with the communication switch in the fifth network. Alternatively or additionally, the fifth network may also be communicatively coupled with one or more additional networks that include one or more fire alarm control panels, switches, gateways, etc. In some embodiments, the various components, devices, and/or networks may comprise a hybrid mesh network.

Figure 8:
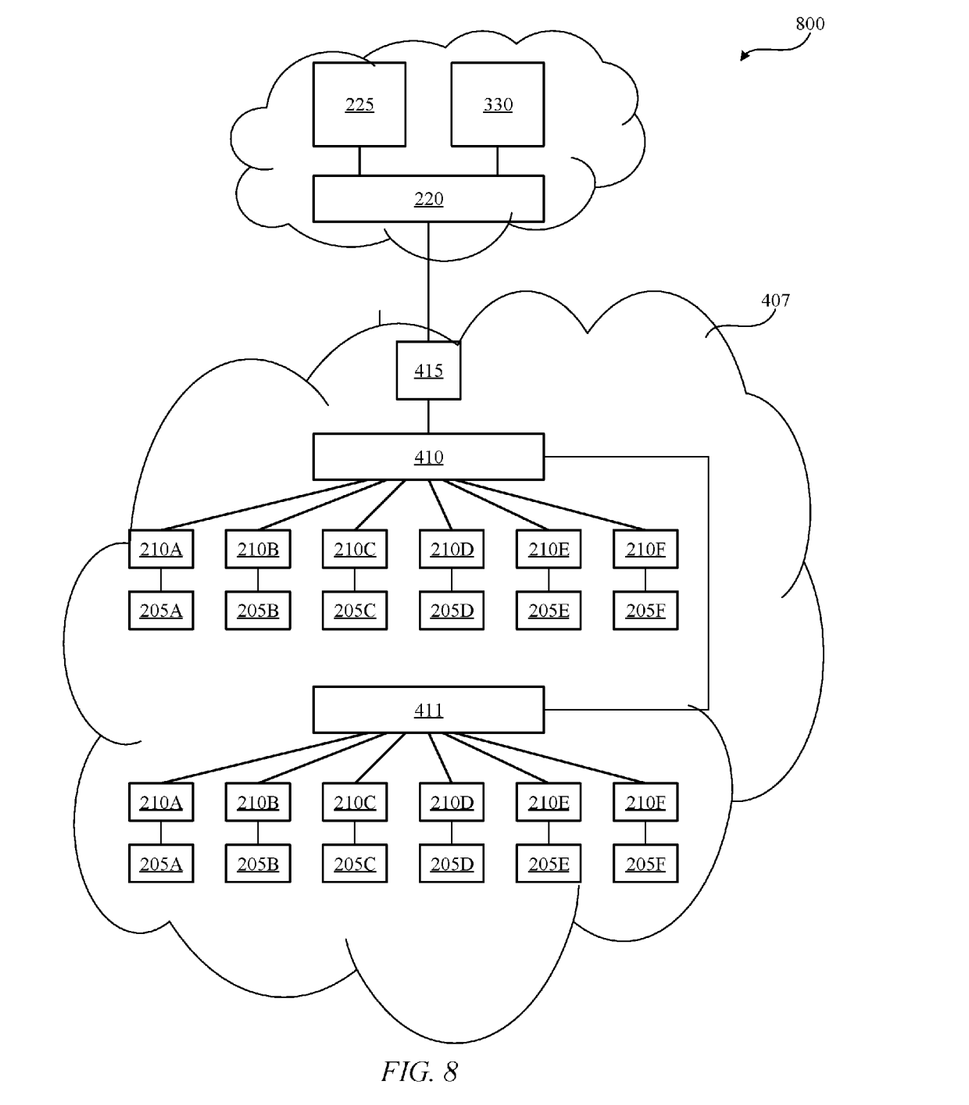
FIG. 8 is a block diagram of a fire alarm control system according to some embodiments.

FIG. 8 is a block diagram of a fire alarm control system 800 according to some embodiments. The fire alarm control system 800 includes network subsystem 407 communicatively coupled with communication switch 220.

Various other network configurations may be used such that token passing fire alarm control panels are networked with one or more control systems without using data through other fire alarm control panels.

In some embodiments a token passing protocol is used for communication between devices. A token passing protocol may include ARCNET, BACnet, and token ring.

The term "substantially" means within 5% or 10% of the value referred to or within manufacturing tolerances.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. A fire alarm system comprising:
   a first plurality of sensors disposed throughout a first facility;
   a first fire alarm control panel communicatively coupled with the first plurality of sensors;
   a second plurality of sensors disposed throughout a second facility separate and distinct from the first facility;
   a second fire alarm control panel communicatively coupled with the second plurality of sensors;
   a third plurality of sensors disposed throughout a third facility separate and distinct from the first facility and/or the second facility;
   a third fire alarm control panel communicatively coupled with the third plurality of sensors;
   a first networking switch communicatively coupled with the first fire alarm control panel, the second fire alarm control panel, and the third fire alarm control panel, wherein:
   the first networking switch communicates with the first fire alarm control panel using a token passing protocol, wherein in the token passing protocol a token message is passed between the first networking switch and the first fire alarm control panel, wherein the first networking switch or the first fire alarm control panel having the token message at any given time is permitted to communicate;
   the first networking switch communicates with the second fire alarm control panel using the token passing protocol, wherein in the token passing protocol a token message is passed between the first networking switch and the second fire alarm control panel, wherein the first networking switch or the second fire alarm control panel having the token message at any given time is permitted to communicate; and the first networking switch communicates with the third fire alarm control panel using the token passing protocol, wherein in the token passing protocol a token message is passed between the first networking switch and the third fire alarm control panel, wherein the first networking switch or the third fire alarm control panel having the token message at any given time is permitted to communicate;

a control center switch communicatively coupled with the first networking switch; and a control center computer communicatively coupled with the control center switch.

2. The fire alarm system according to claim 1, wherein:
the control center computer is in communication with the first fire alarm control panel via the control center switch, and the first networking switch;
the control center computer is in communication with the second fire alarm control panel via the control center switch, and the first networking switch; and
the control center computer is in communication with the third fire alarm control panel via the control center switch, and the first networking switch.

3. The fire alarm system according to claim 1, wherein:
the control center computer receives data packets from the first fire alarm control panel that do not pass through either or both the second fire alarm control panel and the third fire alarm control panel.

4. The fire alarm system according to claim 1, further comprising:
a gateway communicatively coupled with the first networking switch and the control center switch such that data passed between the first networking switch and the control center switch passes through the gateway.

5. The fire alarm system according to claim 1, wherein:
the first networking switch is communicatively coupled with the first fire alarm control panel via a direct connection;
the first networking switch is communicatively coupled with the second fire alarm control panel via a direct connection; and
the first networking switch is communicatively coupled with the third fire alarm control panel via a direct connection.

6. The fire alarm system according to claim 1, wherein:
the first networking switch is communicatively coupled with the first fire alarm control panel via a single communication cable;
the first networking switch is communicatively coupled with the second fire alarm control panel via a single communication cable; and
the first networking switch is communicatively coupled with the third fire alarm control panel via a single communication cable.

7. The fire alarm system according to claim 1, wherein:
the first networking switch is communicatively coupled with the first fire alarm control panel without passing communication data through another fire alarm device;
the first networking switch is communicatively coupled with the second fire alarm control panel without passing communication data through another fire alarm device; and the first networking switch is communicatively coupled with the third fire alarm control panel without passing communication data through another fire alarm device.

8. The fire alarm system according to claim 1, wherein:
the token passing protocol is an ARCNET-like protocol.

9. The fire alarm system according to claim 1, further comprising:
a first network communication module coupled with the first fire alarm control panel;
a second network communication module coupled with the second fire alarm control panel; and
a third network communication module coupled with the third fire alarm control panel.

10. The fire alarm system according to claim 1, wherein the first fire alarm control panel, the second fire alarm control panel, the third fire alarm control panel, and the first switch are arranged in a hybrid mesh network.

11. A fire alarm system comprising:
a first plurality of sensors disposed throughout a first facility;
a first fire alarm control panel communicatively coupled with the first plurality of sensors;
a second plurality of sensors disposed throughout a second facility separate and distinct from the first facility;
a second fire alarm control panel communicatively coupled with the second plurality of sensors;
a first networking switch directly coupled with the first fire alarm control panel using a token passing protocol over a direct connection between the first networking switch and the first fire alarm control panel, and directly coupled with the second fire alarm control panel using a the passing protocol over a direct connection between the first networking switch and the second fire alarm control panel,
wherein in the token passing protocol a token message is passed between the first networking switch and the first fire alarm control panel via the direct connection, wherein the first networking switch or the first fire alarm control panel having the token message at any given time is permitted to communicate over the direct connection, and
wherein in the token passing protocol a token message is passed between the first networking switch and the second fire alarm control panel via the direct connection, wherein the first networking switch or the second fire alarm control panel having the token message at any given time is permitted to communicate over the direct connection;
a control center switch communicatively coupled with the first networking switch; and
a control center computer communicatively coupled with the control center switch via a non-token passing protocol.

12. The fire alarm system according to claim 11, wherein:
the first networking switch is communicatively coupled with the first fire alarm control panel without passing communication data through another fire alarm device; and
the first networking switch is communicatively coupled with the second fire alarm control panel without passing communication data through another fire alarm device.

13. The fire alarm system according to claim 11, wherein:
the first networking switch is communicatively coupled with the first fire alarm control panel using an ARCNET-like protocol; and the first networking switch is communicatively coupled with the second fire alarm control panel using the ARCNET-like protocol.

14. The fire alarm system according to claim 11, wherein:
the control center computer is in communication with the first fire alarm control panel via the control center switch, and the first networking switch; and
the control center computer is in communication with the second fire alarm control panel via the control center switch, and the first networking switch.

15. The fire alarm system according to claim 11, wherein:
the control center computer receives data packets from the first fire alarm control panel that do not pass through either or both the second fire alarm control panel and a third fire alarm control panel.

16. The fire alarm system according to claim 11, further comprising:
a gateway communicatively coupled with the first networking switch and the control center switch such that non-token passing protocol data is translated to a token passing protocol by the gateway.

17. A fire alarm system comprising:
a first plurality of sensors disposed throughout a first facility;
a first fire alarm control panel communicatively coupled with the first plurality of sensors and configured to communicate via a token passing protocol;
a second plurality of sensors disposed throughout a second facility separate and distinct from the first facility;
a second fire alarm control panel communicatively coupled with the second plurality of sensors and configured to communicate via the token passing protocol;
a first networking switch communicatively coupled with the first fire alarm control panel and the second fire alarm control panel via the token passing protocol;
wherein in the token passing protocol a token message is passed between the first networking switch and the first fire alarm control panel, wherein the first networking switch or the first fire alarm control panel having the token message at any given time is permitted to communicate, and
wherein in the token passing protocol a token message is passed between the first networking switch and the second fire alarm control panel, wherein the first networking switch or the second fire alarm control panel having the token message at any given time is permitted to communicate;
a gateway coupled with the first networking switch;
a control center switch communicatively coupled with the gateway; and
a control center computer communicatively coupled with the control center switch and configured to communicate with the first fire alarm control panel and/or the second fire alarm control panel via a non-token passing protocol.

18. The fire alarm system according to claim 17, further comprising:
a third plurality of sensors disposed throughout a third facility separate and distinct from the first facility and/or the second facility;
a third fire alarm control panel communicatively coupled with the third plurality of sensors; and
a second networking switch communicatively coupled with the third fire alarm control panel.

* * * * *